United States Patent Office 3,314,140
Patented Apr. 18, 1967

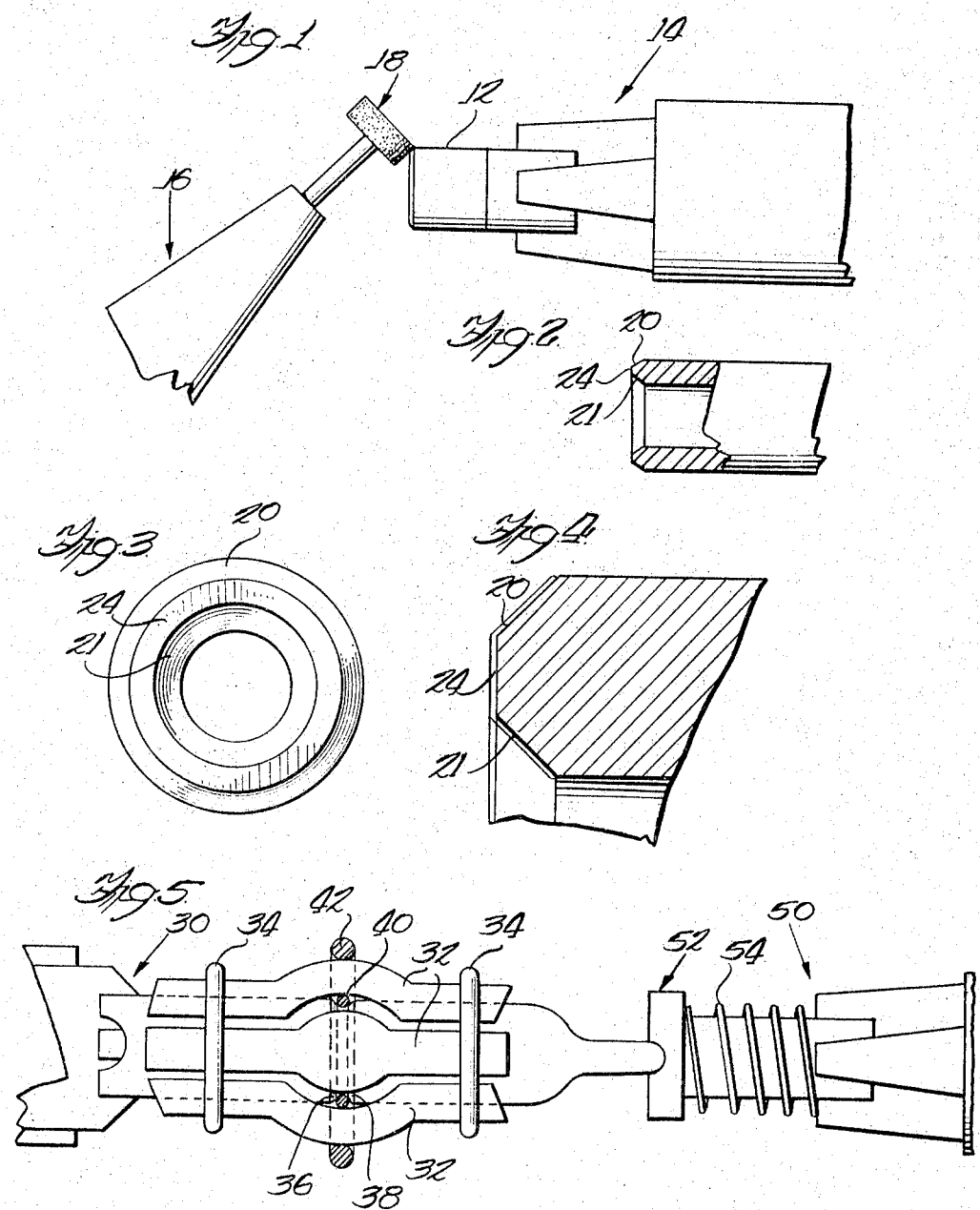

3,314,140
METHOD OF MAKING A SURFACE JOINT
Merritt W. Albright, 23 Eisenhower Road,
Peabody, Mass. 01960
Filed May 14, 1964, Ser. No. 367,537
8 Claims. (Cl. 29—473.1)

This invention relates to a surface joint and its preparation, and more particularly to that type of surface joint regularly found in glass to glass seals on glass tubular objects used in manufacturing, for example, dewars.

It is the primary object of the present invention to provide a method for the preparation of a seal which may be made between two glass elements, or glass and metal.

Another object of the invention is to provide a method for the preparation of a glass to glass seal which is adaptable to high quality production, utilizing existing equipment, and at a modest cost commensurate with the results obtained.

Still another object of the invention is to provide a method for the preparation of a glass to metal seal and for the preparation of the surface joint between two objects upon which glass to metal seals have been applied.

A still further object of the invention is to provide a method for the preparation of the surface joint between two glass tubular objects, used in manufacturing dewars.

Further objects of the invention will in part be obvious and will in part appear hereinafter.

In broad outline, the subject invention contemplates a method for the preparation of a joint for sealing, as well as the joint itself. The objects to be sealed are first provided with complementary faces, normally the two faces of the ends of a glass tube. The faces of the host material are beveled, and a thin coating of platinum paste is applied to the flat surface and the two beveled edges of each object. The objects are then pre-baked, and fired, to form a layer of platinum on the faces. After a sufficient layer of platinum has been applied, the faces having the platinum layer thereon are tinned, preferably with a low temperature solder. The faces are now prepared so that the two objects may be joined together.

These two objects are placed end to end, with a low temperature solder soldering ring between the tinned edges in an assembly which is arranged to rotate the objects and to urge the ends thereof together. The soldering ring is then heated until it melts, and the two ends come together. The two objects, which now form a dewar, are rotated while the solder cools so that the melted solder will form an even ring about the joint.

The dewar can then be buffed and leak tested. Should any leaks result they can be repaired with solder and a soldering iron.

The invention accordingly comprises the several steps in the relation of one or more of such steps with respect to each of the others, and the article possessing the features, properties, and the relation of elements, which are exemplified in the following detailed disclosure, and the scope of the invention will be indicated in the claims.

For a fuller understanding of the nature and object of the invention, reference should be had to the following detailed description taken in connection with the accompanying drawing, in which:

FIGURE 1 is a view illustrating how the ends of glass tubular objects, used in manufacturing dewars, may be prepared;

FIGURE 2 is a sectional view of a glass tubular object prepared for a seal in accordance with a method illustrative of the present invention;

FIGURE 3 is an end view of the glass tubular object of FIG. 2;

FIGURE 4 is an enlarged, sectional view of one edge of the glass tubular object of FIG. 2; and FIGURE 5 is a view illustrating how the tubular glass objects, prepared in accordance with a method illustrative of the present invention, are joined together to form a dewar flask.

Referring now to the drawing, the invention will be better understood by reference to a description of the actual preparation of a seal during the manufacture of a dewar of the character illustrated in FIG. 5.

The joint is prepared as illustrated in FIGS. 1–4. Since the ends of the tubular glass objects are prepared in the same fashion, only the preparation of the end of one of the glass objects is shown and described.

The tubular glass object, as illustrated in FIG. 1, is placed in the chuck 14 of a glass lathe and rotated. The inner and outer edges of the tubular glass object 12 is beveled at a 45° angle, as may be best seen in FIGS. 2–4. This beveling may be performed with a dental tool 16, using a fine ground dentist wheel 18. In grinding the bevels, the rotation of the dentist wheel 18, when positioned as shown in FIG. 1, is preferably in the opposite direction of rotation as the lathe so that a greater grinding action is provided.

Also, substantially the entire length of the glass object 12 is preferably taped before placing the same in the chuck 14 of the glass lathe, to prevent breakage.

The beveled edges 20 and 21 of the glass object 12 are then polished, while the glass object is rotated in the lathe. A 400 SiC polishing paper is satisfactory for this operation. After polishing, the glass object 12 is cleaned by rinsing it sequentially in hot chromic acid, hot water and then finally in distilled water.

If a fired silver coating is used on the inside surface of the glass objects, care must be taken so that the chromic acid does not come in contact with the silver coating, since the chromic acid will erode it.

After the edges of the glass object 12 have been prepared, as described above, a thin coating of a paste containing a mixture of platinum, silver, glass frit and organic binders is applied to completely cover the flat surface 24 and the beveled edges 20 and 21, as may be best seen in FIG. 4. It is found that a paste commonly known as Du Pont No. 6855 Platinum Paste may advantageously be used. It is extremely important that the paste is thoroughly mixed before applying it to the glass object to insure that the paste applied has a correct ratio of components.

The thin coating of platinum paste may be applied with a clean soft brush, while the glass object 12 is rotated in the lathe. No attempt should be made to remove any excess platinum paste at this time, since it cannot be removed completely or neatly before it is baked.

The platinum paste coated on the glass object 12 is prebaked with sufficient heat to drive off the volatiles, without boiling the platinum paste coating. The prebaking temperature should be sufficient to cause the platinum paste to smoke, or drive off the vapor, and the prebaking time should be extended until the platinum paste has stopped smoking completely, at which time the platinum paste has turned from a dark to a light gray color. Using the above-mentioned Du Pont No. 6855 Platinum Paste, the paste may be prebaked for approximately 30 minutes, at a temperature of approximately 400–500° F.

In prebaking the platinum paste coating on the glass object 12, care should be taken that the platinum paste is not heated too fast or too slow. If the platinum paste becomes too hot, too quickly, it will boil and the final result will be pitted. If the prebaking is excessively slow, the platinum paste will evaporate and the final result will show cracking. Also, care should be taken that the glass object 12 is clean. If the glass object 12 is dirty, skip areas will show in the final result.

After the prebaking operation, the excess platinum, if any, on the edges of the glass object 12 is scraped off and the excess powders removed using a cotton tip or the like. Since it is virtually impossible to remove after firing, the excess platinum must be scraped off before the firing operation.

After the excess platinum coated on the beveled edges of the glass object 12 has been cleaned off, the platinum is fired at a temperature of approximately 1000° F., until the layer of platinum is continuous and nearly opaque. If the platinum coating fails to fire, apply a fresh coating of platinum paste and refire the platinum coating at a higher temperature. The coating of platinum in this manner will give a sufficient layer to be tinned and retinned.

The platinum coating after firing is brushed clean of oxides with steel wool. Two methods may be used to prebake and to fire the platinum coating on the glass object 12. Where a large number of glass objects are being fired, an oven may advantageously be used since all of them may be prebaked, or fired, simultaneously. In such cases, an oven temperature of 400–500° F. is used, and the platinum paste is prebaked for approximately 30 minutes, or until it has stopped smoking completely. In firing the glass objects in an oven, a temperature of 1000–1500° F. is used, and the paste is fired from 20 minutes to 3 hours.

If only a small number of glass objects are being prebaked, or fired, a heating coil may advantageously be used, since it has a much shorter warm-up and cool-down time, and is therefore much quicker. For prebaking the platinum paste, a power supply with approximately 35 volts output is used to energize the heating coil. For firing the platinum paste a power supply with approximately 65 volts output is used. At this voltage, the heating coil should become incandescent, and should be at a temperature of approximately 1000° F. The glass object 12 is fired for one minute and allowed to cool as it stands.

In using either an oven or a heating coil, heat sinking or quick cooling of the glass object 12 should be avoided, since this will cause stresses.

After the platinum has been fired, as described above, it is tinned using a low temperature solder which may be applied thereto with a small soldering iron. Any good low temperature solder, such as Kester low temperature solder, may be used. Before applying the solder, a liquid non-acid flux should be applied to the surface of the platinum. Care should be taken that an excess amount of flux is not applied.

When the edges, or faces, of the tubular glass objects have been prepared, as described above, the two glass objects may be joined together to form a dewar. This may be accomplished as described below.

The two glass objects are taped, as previously described, to prevent breakage, and the two objects placed end to end so that the tinned edges 36 and 38 of the objects, respectively, are facing one another. A soldering ring 40 having the same diameter as the glass objects is placed between the tinned edges 36 and 38. This whole assembly may be held together by means of glass sections 32 spaced around the two glass objects and retained thereon by means of high temperature rubber washers 34, as shown in FIG. 5. The two glass objects, assembled as described above, are placed on a lathe with the end of one of the glass objects secured within the chuck 30 of the lathe and the end of the other glass object butted against a cork 52 secured within the chuck 50 of the lathe. The cork 52 is preferably spring loaded by means of a spring 54 or the like so that the ends 36 and 38 of the two glass objects are urged together when the solder ring 40 melts.

A heating coil 42, which may be fabricated from Nichrome, is positioned about the assembly so that it overlays the solder ring 40, as shown in FIG. 5. The coil 42 is energized by means of a variable power supply and its output is slowly advanced until the solder ring 40 melts and the edges 36 and 38 of the two glass objects, respectively, come together. When the solder ring 40 has melted, the coil 42 is allowed to cool by turning off the power supply. The two glass objects, which now form a dewar, are allowed to rotate so that the melted solder will form an even ring about the periphery of the two objects.

After the solder has cooled, the dewar is preferably buffed with steel wool and leak tested. Any leaks resulting may be touched up with solder and a soldering iron.

While the above description relates to preparing a surface joint on round tubular objects, it is evident that surface joints on objects having shapes other than round, such as square, rectangular, triangular and elliptical, can be prepared using the same method by merely modifying the apparatus for holding and rotating the same. The invention therefore is not intended to be limited to preparing surface joints on round tubular objects.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A method for the preparation of a glass member for soldering comprising the steps of, beveling the edge of the glass object at a 45° angle, polishing the beveled edge, cleaning the beveled edge in hot chromic acid, rinsing the beveled edge in hot water, rinsing the edge in distilled water, applying a thin layer of platinum paste which has been thoroughly mixed to the beveled edge of the glass object, prebaking the glass object for approximately 30 minutes at a temperature of 400–500° F. to drive off the volatiles in the platinum paste, firing the glass object at a temperature of approximately 1000° F., applying a liquid, non-acid flux to the surface of the platinum layer, and tinning the platinum layer with a low temperature solder.

2. A method for the preparation of glass for soldering comprising the steps of, taping the glass object to prevent breakage, placing the glass object in a lathe and rotating the same, beveling the edge of the glass object at a 45° angle using a dental tool having a fine ground dentist wheel, polishing the beveled edges, cleaning the beveled edges in hot chromic acid, rinsing the beveled edges in hot water, rinsing the beveled edges in distilled water, applying a thin layer of platinum paste which has been thoroughly mixed to the beveled edges of the glass object, prebaking the glass object at a temperature of 400–500° F. until the platinum paste has stopped smoking, firing the glass object at a temperature of approximately 1000° F. until the platinum is nearly opaque, applying a liquid non-acid flux to the platinum layer, and tinning the platinum layer with a low temperature solder.

3. The method of claim 2 wherein the platinum paste is a composition comprised of a mixture of platinum, silver, glass frit and organic binders.

4. The method of claim 2 wherein the glass object is prebaked in an oven.

5. The method of claim 2 wherein the glass object is prebaked using a heating coil.

6. A method for the preparation of a surface joint made between two glass tubular objects comprising the steps of, beveling the ends of the glass objects, coating the flat surface and the beveled edges of the glass objects with a thin layer of platinum paste, prebaking the glass objects with sufficient heat to drive off volatiles in the platinum paste, firing the glass objects until the platinum layer is nearly opaque, tinning the platinum layer with a low temperature solder, placing the glass objects end to end with the tinned edges facing one another, placing a solder ring between the tinned edges, rotating the two glass objects while urging the ends thereof together, and applying heat to melt the solder ring, so that an even ring is formed about the periphery of the two objects at the surface joint.

7. A method for the preparation of a surface joint made between two glass tubular objects comprising the steps of, beveling the edges of the glass objects at a 45° angle, polishing the beveled edges, cleaning the beveled edges in hot chromic acid, rinsing the beveled edges in hot water, rinsing the edges in distilled water, applying a thin layer of platinum paste which has been thoroughly mixed to the beveled edges of the glass objects, prebaking the glass objects for approximately 30 minutes at a temperature of 400–500° F. to drive off the volatiles in the platinum paste, firing the glass objects at a temperature of approximately 1000° F., applying a liquid, non-acid flux to the surface of the platinum layers, tinning the platinum layers with a low temperature solder, placing the glass objects end to end with the tinned edges facing one another, placing a solder ring between the tinned edges, rotating the two glass objects while urging the ends thereof together, and applying heat to melt the solder ring, so that an even ring is formed about the periphery of the two objects at the surface joint.

8. A method for the preparation of a surface joint between two glass tubular objects comprising the steps of, taping the glass objects to prevent breakage, placing the glass objects in a lathe and rotating the same, beveling the edge of the glass objects at a 45° angle using a dental tool having a fine ground dentist wheel, polishing the beveled edges, cleaning the beveled edges in hot chromic acid, rinsing the beveled edges in hot water, rinsing the beveled edges in distilled water, applying a thin layer of platinum paste which has been thoroughly mixed to the beveled edges of the glass objects, prebaking the glass objects at a temperature of 400–500° F. until the platinum paste has stopped smoking, firing the glass objects at a temperature of approximately 1000° F. until the platinum is nearly opaque, applying a liquid, non-acid flux to the platinum layers, tinning the platinum layers with a low temperature solder, placing the glass objects in a lathe with the tinned edges facing one another, placing a solder ring between the tinned edges, placing a heating coil about the glass objects so that it overlays the solder ring, and rotating the glass objects while energizing the heating coil to melt the solder ring so that an even ring is formed about the periphery of the glass objects at the surface joint.

References Cited by the Examiner

UNITED STATES PATENTS

| | | | |
|---|---|---|---|
| 1,639,575 | 8/1927 | Robinson. | |
| 2,139,431 | 12/1938 | Vatter | 29—472.7 |
| 2,281,843 | 5/1942 | Jira | 117—46 |
| 2,335,376 | 11/1943 | Ballintine et al. | 29—472.7 |
| 2,633,374 | 3/1953 | Boice | 285—287 |
| 2,685,893 | 8/1954 | Phipps | 285—287 |
| 2,694,016 | 11/1954 | Craven et al. | 117—124 |
| 2,897,583 | 10/1959 | Patrichi | 29—472.5 |
| 3,215,555 | 11/1965 | Krey | 117—123 |

OTHER REFERENCES

Glass to Metal Seals, by Edwin Ruh, Ceramic Age, vol. 55, issue 4, pps. 236 and 237, April 1950.

JOHN F. CAMPBELL, *Primary Examiner.*

CARL W. TOMLIN, *Examiner.*

D. W. AROLA, L. WESTFALL, *Assistant Examiners.*